United States Patent Office 2,742,430
Patented Apr. 17, 1956

2,742,430
CONCENTRATES USEFUL AS ADDITIVES IN MINERAL OIL COMPOSITIONS AND MINERAL OIL COMPOSITIONS CONTAINING SAME

Joseph J. McBride, Jr., Cranford, N. J., assignor to Tide Water Associated Oil Company, Bayonne, N. J., a corporation of Delaware No Drawing. Application January 15, 1953, Serial No. 331,496

11 Claims. (Cl. 252—46.7)

The present invention relates to mineral oil compositions and, more particularly, to such compositions of lubricating grade. Additionally, the invention relates to compositions in the form of concentrates useful as additive agents for mineral oils to impart certain desired properties to such oils, inclusive of improving the oil against oxidation and the tendency to corrode metals, especially bearing-metal alloys, in contact therewith.

The compositions embodied herein are characterized by containing, as an additive material, a novel oil-soluble substantially ash-free phosphorus-, sulfur-, and nitrogen-containing product of reaction between (a) a nitrile of a propenoic acid and (b) an acidic phosphorus-, and sulfur-containing product of reaction between a phosphorus sulfide and a hydrocarbon.

Of the nitriles of propenoic acids contemplated for use in preparation of the additive material, acrylonitrile and crotononitrile are particularly suitable and represent preferred embodiments. The invention may, however, be practiced with other nitriles of substituted propenoic acids, inclusive of homologs of acrylonitrile and crotononitrile. Also contemplated are nitriles of other substituted propenoic acids such as methacrylic acid, ethacrylic acid, and the like.

The acidic substances, containing phosphorus and sulfur, contemplated for reaction with the aforesaid nitriles may be selected from a variety of such substances prepared by reaction between phosphorus sulfides and hydrocarbons. Numerous substances of that type are known to the art and, hence, it is not considered necessary to describe such products in detail herein. For purposes of illustration, however, U. S. Patent No. 2,316,080 describes such products of reaction between phosphorus sulfides and olefin polymers; U. S. Patent No. 2,316,081 describes products of reaction between phosphorus sulfides and aromatics; and U. S. Patent No. 2,316,082 describes products of reaction between phosphorus sulfides and other types of hydrocarbons, including saturated hydrocarbons. Other suitable products of reaction between phosphorus sulfides and hydrocarbons, and useful in practice of this invention, are disclosed in the copending application of Bishop, Serial No. 309,152 filed September 11, 1952, entitled "Catalyzed Phosphorus Sulfide-Hydrocarbon Reaction Products and Method of Making Same." Although still other disclosures exist pertaining to phosphorus sulfide-hydrocarbon reaction products that are acidic and contain both phosphorus and sulfur, the aforesaid specifically-referred to patents serve to show the reactivity, under a variety of conditions, between phosphorus sulfides and various types of hydrocarbons to form reaction products that are oil-soluble per se and/or when neutralized with basic materials. The generic aspect of this invention contemplates use of such reaction products. Hence, and although hydrocarbons of a certain type have been employed in the illustrative embodiments of the invention set forth hereinafter, such hydrocarbons have been used for purposes of illustration and not limitation.

In order to illustrate such embodiments, the following examples set forth preparation of inhibiting materials by reaction between the stated nitriles and acidic reactants as aforedescribed.

(A)

*Preparation of $P_2S_5$-hydrocarbon (furfural extract) reaction product*

A mixture was prepared comprising 15 grams of $P_2S_5$, 180 grams of a furfural extract, 180 grams of a light turbine oil, and 3% by weight (based on the weight of extract) of zinc chloride catalyst. The furfural extract employed was obtained as an extract in selective solvent (furfural) defining of a Penn neutral oil, said extract being characterized by having the following properties: Specific extinction coefficient of 58.8 at 2600 A.; viscosity (SUS) of 73.8 at 210° F.; gravity of 8.0° A. P. I.; and an average molecular weight of 316.

The aforesaid mixture was heated at 150° C. for two hours with continuous stirring. The reacted mixture was then decanted (to removed unreacted $P_2S_5$) with recovery of a liquid concentrate (in light turbine oil) of which about 50% by weight was the acidic, phosphorus- and sulfur-containing product of reaction between $P_2S_5$ and hydrocarbons in the aforesaid reaction mixture. The concentrate had a neutralization number of 22.0.

EXAMPLE I

A reaction mixture was prepared by use of (a) 40.0 grams of the aforesaid concentrate and (b) 0.84 gram of acrylonitrile. The mixture was maintained at 65° C. for one hour during which reaction (exothermic) occurred between the reactants to produce a liquid concentrate (in light turbine oil) of which about 50% by weight was the nitrogen-, phosphorus-, and sulfur-containing product of reaction between the nitrile and the acidic concentrate. The concentrate containing the nitrile reaction product had a neutralization number of 7.1 and a sulfur content of 2.05%.

EXAMPLE II

A reaction mixture was prepared comprising 1.68 grams of acrylonitrile and 40.0 grams of the concentrate of the acidic $P_2S_5$-hydrocarbon product prepared in (A). The mixture was reacted under the same conditions set forth in Example I whereby an oil-soluble liquid reaction product was obtained, said product being an approximately 50% by weight concentrate, in the turbine oil, of a nitrogen-, phosphorus-, and sulfur-containing product of reaction between the nitrile and acidic reactant. The concentrate had a neutralization number of 6.7, a phosphorus content of 0.64% and a sulfur content of 2.03%.

EXAMPLE III

A reaction mixture identical to that of Example I was prepared and reacted at 75° C. for three hours whereby an oil-soluble liquid reaction product was obtained, said product being an approximately 50% by weight concentrate, in the turbine oil, of a nitrogen-, phosphorus-, and sulfur-containing product of reaction between the nitrile and acidic reactant. The concentrate had a neutralization number of 7.2, a phosphorus content of 0.77%, and a sulfur content of 1.95%.

EXAMPLE IV

A reaction mixture was prepared comprising 0.53 gram of crotononitrile and 20 grams of a concentrate of an acid $P_2S_5$-furfural extract reaction product prepared as in (A) and having a neutralization number of 22. The mixture was reacted at 75° C. for three hours to produce an approximately 50% by weight concentrate, in the turbine oil, of a nitrogen-, phosphorus-, and sulfur-containing product of reaction between crotononitrile and the acidic reactant. The concentrate had a neutralization number of 8.3 and a phosphorus content of 0.72%.

Mineral oil compositions were prepared by dissolving, in a furfural refined SAE 30 oil of lubricating grade, 3% by weight of the concentrates containing the nitrogen-, phosphorus-, and sulfur-containing reaction products prepared in Examples I to IV, inclusive. To illustrate the effectiveness of such products as oxidation and corrosion-inhibitors, each of the compositions was subjected to the following test procedure:

*Test procedure.*—250 grams of the oil composition, 74–75 square inches of iron wire, 10 square inches of copper wire, and 20 square inches of lead foil surface are placed in a container having an inlet for oxygen and an exit tube for oxidation products and unused oxygen, the aforesaid metals being maintained immersed in the oil. Oxygen is bubbled through the oil (maintained at 150° C. and at atmospheric pressure) at the rate of 30.35 liters per hour and at the end of 20 hours the lead foil surface is cleaned and weighed. The difference between its weight before the test and the loss of weight that occurred during the test is an indication of the corrosive tendency of the oil compositions whereas the difference between the amount of oxygen bubbled through the oil and the amount of unused oxygen is indicative of the oxidation characteristics of the composition.

The following tabulation sets forth data obtained pertaining to lead loss and oxygen absorption characteristics of the aforesaid compositions under the conditions of the test procedure and, for purposes of comparison, the tabulation sets forth corresponding lead loss and oxygen absorption values characteristic of a furfural refined SAE 30 oil as used in preparing the compositions but devoid of the additive component of this invention.

|  | Compositions Of— | | | | Furfural Refined SAE 30 Oil |
|---|---|---|---|---|---|
|  | Example I | Example II | Example III | Example IV |  |
| Lead loss in milligrams | 14 | 21 | 12 | 32 | 1,242 |
| Oxygen Absorption (ml. O₂/hr.) | 33 | 45 | 36 | 46 | 436 |

In preparation of the acidic reactant by reaction of a phosphorus sulfide with a hydrocarbon and/or in carrying out the reaction between the stated nitriles and the acidic substance the reactions may be carried out in the presence of additional liquid substances, the presence of which may be desired in the reaction mixture for certain purposes. In illustration, the acidic reactant employed may be a high viscosity material and the reaction thereof with the stated nitriles may be facilitated by addition of a lower viscosity material (e. g. a diluent) in the reaction mixture. For such purposes low viscosity hydrocarbons such as naphtha, light lubricating oil, and the like may be employed. The added liquid substance may be removed by conventional means following the reaction or may be allowed to remain with the reaction products if it does not deleteriously affect the performance of the desired reaction products in intended usage thereof. In connection therewith, and particularly when the reaction products contemplated herein are to be used as additives for lubricating oil compositions, the reactions are desirably carried out in the presence of a low viscosity mineral oil of lubricating grade whereby, as illustrated in the foregoing examples, the reaction product is obtained as a concentrate useful directly as a lubricating oil additive. Thus, embodied herein are compositions useful as additives for mineral oils and which compositions are concentrates of the desired reaction products in liquid hydrocarbon. In such concentrates, the amount of reaction product may be the major constituent by weight of the composition but it should be understood that concentrates may also be used wherein the reaction product does not constitute the major ingredient by weight. The amount of reaction product actually employed in the concentrate is, therefore, not critical and, from a practical matter, the amount of reaction product in the concentrate is such that it will be of proper viscosity to facilitate handling and blending with a mineral oil.

In the foregoing examples, a concentration of about 1.5% by weight of active reaction material was used in preparing the oil compositions subjected to the described test procedure. Such concentrations have been employed for purposes of illustration and not limitation as the invention embodies oil compositions containing amounts of the stated reaction product other than the amounts specifically set fourth. Thus, oil compositions are contemplated containing the stated product in smaller or larger amounts than specifically set forth hereinbefore with the actual concentration employed being dependent upon intended usage of the oil composition, coupled with consideration from an economic viewpoint of the minimum amount of additive to use to impart the desired properties to the oil under the conditions of intended usage. For most purposes, however, an amount of the stated reaction product within the range of about 0.1 to about 20 per cent by weight of the oil composition may be suitably used.

For the mineral oil component of the compositions embodied herein, usage is contemplated of mineral oil fractions that may vary over a rather wide range with respect to properties such as viscosity, viscosity index and others and to which fractions it is desired to impart improved properties. Thus, the mineral oil component may be a highly refined oil, such as those known to the art as solvent extracted oils, acid treated oils, and the like, or fractions derived from petroleum and useful for particular purposes without resort to extensive refining operations. In a particular embodiment, the mineral oil component is a heavy or light mineral oil fraction, or blend of such fractions, of suitable viscosity characteristics for lubrication purposes, particularly for lubrication of internal combustion engines.

With reference to the reaction between the stated nitriles and acidic reactants, the amount of nitrile employed may be varied depending upon the extent to which it is desired to carry out reaction with the acidic substance. For obtaining optimum conversion of the acidic substance to the nitrile reaction products thereof, it is preferred to employ an amount of nitrile sufficient to enable the reaction to proceed until substantially all of the acidic product has reacted and obtainment of such a result is facilitated by using an amount of nitrile in excess of that theoretically sufficient to react with the acidic substance. Any unreacted nitrile may be subsequently removed from the reacted mixture or, in cases wherein the excess nitrile does not impart undesired properties in the intended usage of the reaction product, it may be allowed to remain therewith. Illustrative of specific embodiments of the invention for preparation of the desired reaction products are the amounts of nitrile to acidic substance as employed in the foregoing examples and in which the amount of nitrile employed was either equivalent to or in excess of that theoretically required to react with the amount of acidic substance employed. On the other hand, and in the reaction of certain nitriles with the stated acidic products wherein complete utilization of the acidic substance is not readily obtainable, or is not desired, lesser amounts of the nitriles may be used so as to avoid presence of unreacted nitrile in the reacted mixture and thus eliminate need for removal of unreacted nitrile from the reaction mixture when its presence in such a mixture is not desired.

With further reference to the reaction that occurs between the stated nitriles and acidic phosphorus-, and sulfur-containing reactants, the reaction is of the exothermic type, proceeds rather rapidly, and in some cases, spontaneously. Hence, exceedingly high temperatures are not only not essential, but are actually undesired as in some instances, depending upon the particular nitrile employed, undesired polymerization of the nitrile reactant may be induced. Thus, the temperature conditions for the reaction are not limitative except that, depending on the particular nitrile used, the reaction temperature should be below that sufficient to induce substantial polymerization of the nitrile reactant. As an illustrative embodiment, and particularly with use of lower molecular weight propenoic acid nitriles such as acrylonitrile and crotononitrile, reaction temperatures of from about room temperature to about 100° C. may be employed, with more specific illustrations being temperatures on the order of 65° and 75° C. as used in the foregoing examples.

As to reaction time, it is preferred that the reactants be maintained under reaction conditions until the reaction mixture substantially ceases to decrease the neutralization number. Generally speaking, the time required to attain such a result is not critical to the extent that a set time can be given irrespective of the particular nitriles, acidic substances and other conditions employed. As aforesaid, the reaction proceeds rather rapidly, and in some cases spontaneously, and hence extended reaction times are not usually required. Thus, the most suitable conditions, inclusive of time, to effect desired reaction of particular nitriles with the particular acidic substances can be readily determined by simple experimentation by those skilled in the art. For most purposes, however, a reaction time up to about 3 hours usually produces suitable results although in many cases the extent to which reaction occurs may be complete after about one-quarter of an hour. A specific illustration thereof is a reaction time of about one to three hours as used in preparation of the reaction products of Examples I to IV, inclusive. Although such reaction conditions normally result in production of the desired products in substantially optimum yields, it should be understood that they are illustrative and not limitative conditions. Hence, the conditions employed may be varied depending upon particular requirements, taking into consideration the particular nitriles and acidic reactants employed, desired extent of reaction, and the like.

As is apparent from the foregoing examples wherein neutralization values are set forth for the acidic reactant and the desired reacted mixture, the neutralization values for the reaction mixture are substantially lower than the neutralization number of the acidic phosphorus-, and sulfur-containing reactant. The reaction is believed to be of the addition type between the olefinic linkage in the propenoic acid nitrile and certain acidic groups of the phosphorus-, and sulfur-containing acidic reactant. Hence, the lowering of the neutralization number is clearly the result of a reaction between the propenoic acid nitriles (neutral products) and the acidic reactant different from the conventional acid-base neutralization reactions employed in the art for neutralizing acidic substances such as employed herein for reaction with the stated nitriles. Products of reaction between the aforesaid nitriles and acidic reactant, as embodied for practice of the invention claimed herein, are disclosed and claimed as novel products in my copending application, Serial No. 416,399, filed March 15, 1954, and entitled "Addition Products of Propenoic Acid Nitriles and Acidic, Phosphorus- and Sulfur-Containing Products."

Although the present invention has been described in conjunction with certain preferred embodiments thereof, those skilled in the art will readily recognize that variations and modifications can be made. Such modifications and variations are to be considered to be within the purview of the specification and scope of the appended claims. Thus, as aforesaid, hydrocarbons other than those shown by examples hereinbefore may be used in preparing the acidic reactant and, in further illustration thereof, products of reaction between (1) acrylonitrile or crotononitrile and (2) acidic products of reaction between $P_2S_5$ and polyolefins (polybutenes) have also been prepared and found to possess utility as anti-oxidant and anti-corrosion agents for mineral oils. Moreover, it should be understood that mineral oil compositions, as embodied herein, may also contain additional ingredients for imparting other desired properties to the compositions. In illustration, the compositions may contain anti-foam agents, e. g. of the silicone type, viscosity index improvers e. g. polyacrylates, and the like.

I claim:

1. A composition comprising a mineral oil in major amount based on the weight of the composition and a small amount, sufficient to inhibit said composition against the tendency to oxidize and corrode metals in contact therewith, of an oil-soluble phosphorus-, sulfur-, and nitrogen-containing addition product of (a) a nitrile of an acid from the group consisting of propenoic acid and relatively low molecular weight alkyl-substituted propenoic acid and (b) an acidic phosphorous-, and sulfur-containing product of reaction between a phosphorus sulfide and a hydrocarbon.

2. A composition, as defined in claim 1, wherein the nitrile is a member from the group consisting of acrylonitrile and crotononitrile.

3. A composition comprising a mineral oil of lubricating grade in major amount based on the weight of the composition and a small amount, sufficient to inhibit said composition against the tendency to oxidize and corrode metals in contact therewith of an oil-soluble phosphorus-, sulfur-, and nitrogen-containing addition product of (a) a nitrile from the group consisting of acrylonitrile and crotononitrile and (b) an acidic phosphorus-, and sulfur-containing product of reaction between phosphorus pentasulfide and a hydrocarbon.

4. A liquid concentrate, suitable for use as an anti-oxidant and anti-corrosion additive for mineral oils, comprising a mineral oil solution of an oil-soluble phosphorus-, sulfur-, and nitrogen-containing addition product of (a) a nitrile of an acid from the group consisting of propenoic acid and relatively low molecular weight alkyl-substituted propenoic acid and (b) an acidic phosphorus-, and sulfur-containing product of reaction between a phosphorus sulfide and a hydrocarbon.

5. A composition, as defined in claim 4, wherein the nitrile is a member from the group consisting of acrylonitrile and crotononitrile.

6. A composition, as defined in claim 4, wherein the oil-soluble phosphorus-, sulfur-, and nitrogen-containing product is an addition product of (a) a nitrile of an acid from the group consisting of acrylic acid and crotonic acid and (b) an acidic phosphorus-, and sulfur-containing product of reaction between phosphorus pentasulfide and a hydrocarbon.

7. A liquid concentrate, suitable for use as an anti-oxidant and anti-corrosion additive for mineral oils, comprising a mineral oil and an oil-soluble phosphorus-, sulfur-, and nitrogen-containing addition product of (a) a nitrile of an acid from the group consisting of propenoic acid and alkyl-substituted propenoic acid and (b) an acidic phosphorus- and sulfur-containing product of reaction between a phosphorus sulfide and a hydrocarbon, said concentrate being characterized in that said product is present therein in an amount up to about 50 per cent by weight of the concentrate.

8. A liquid concentrate, as defined in claim 4, wherein the phosphorus sulfide is phosphorus pentasulfide and the hydrocarbon is an aromatic-rich solvent extract of a mineral oil lubricating fraction.

9. A liquid concentrate, as defined in claim 8, wherein the solvent extract is a furfural extract.

10. A composition, as defined in claim 1, wherein the phosphorus sulfide is phosphorus pentasulfide and the hydrocarbon is an aromatic-rich solvent extract of a mineral oil lubricating fraction.

11. A composition, as defined in claim 10, wherein the solvent extract is a furfural extract.

References Cited in the file of this patent

UNITED STATES PATENTS 2,593,496    Smith et al.  ---------- Apr. 22, 1952